United States Patent [19]
Gard

[11] Patent Number: 6,114,427
[45] Date of Patent: Sep. 5, 2000

[54] METHOD FOR PRODUCING A DISPERSIBLE, FINE TITANIUM PYROPHOSPHATE POWDER

[75] Inventor: David R. Gard, Ballwin, Mo.

[73] Assignee: Solutia Inc., St. Louis, Mo.

[21] Appl. No.: 08/997,792

[22] Filed: Dec. 24, 1997

Related U.S. Application Data

[62] Division of application No. 08/597,079, Feb. 5, 1996, Pat. No. 5,733,519.

[51] Int. Cl.⁷ ...................................................... C08K 3/10
[52] U.S. Cl. ............................................................. 524/413
[58] Field of Search ............................................. 524/413

[56] References Cited

U.S. PATENT DOCUMENTS

| | | |
|---|---|---|
| 2,959,464 | 11/1960 | Craig . |
| 3,471,252 | 10/1969 | Sugahara et al. . |
| 3,558,273 | 1/1971 | Beck . |
| 3,936,304 | 2/1976 | Kasugai et al. . |
| 3,996,322 | 12/1976 | Snelling et al. . |
| 3,996,332 | 12/1976 | Elger et al. . |
| 5,032,639 | 7/1991 | Buchert et al. ........................ 524/413 |
| 5,262,464 | 11/1993 | Koevenig et al. ...................... 524/413 |
| 5,482,768 | 1/1996 | Kawasato et al. . |

FOREIGN PATENT DOCUMENTS

| | | |
|---|---|---|
| 725091 | 1/1966 | Canada . |
| 7026619 | 2/1970 | Japan . |
| 4934499 | 8/1972 | Japan . |
| 219462 | 8/1968 | U.S.S.R. . |
| 823279 | 1/1978 | U.S.S.R. . |
| 1101407 | 7/1984 | U.S.S.R. . |
| 1738754 | 7/1990 | U.S.S.R. . |
| 1282594 | 7/1972 | United Kingdom . |

OTHER PUBLICATIONS

The Journal of the American Ceramic Society, "Reactions in the System $TiO_2$—$P_2O_5$", by Don E. Harrison and F.A. Hummel, College of Mineral Industries, The Pennsylvania State University, University Park, Pennsylvania, vol. 42, No. 10, pp. 487–490, (Dec. 4, 1958).

Journal of The Iron and Steel Institute, 4 Grosvenor Gardens—London SWI, Incorporated by Royal Charter 18, Sep. 1952, vol. 172, Part I, "Phase Equilibrium Investigation of the $Na_2O$–$P_2O5$–$SiO_2$ Ternary System", by E.T. Trukdogan, Ph.D., M.Met., and W.R. Maddocks,Ph.D.

Japanese 08283619 A (Abstract only), Oct. 29, 1996.

*Primary Examiner*—Wayne Langel
*Attorney, Agent, or Firm*—Thompson Coburn LLP; Gordon F. Sieckmann

[57] ABSTRACT

A novel method for forming a dispersable, fine titanium pyrophosphate powder by reacting titanium dioxide and a molar excess of phosphoric acid. The excess phosphoric acid, at a phosphorus pentoxide to titanium dioxide mole ratio greater than one, significantly improves the yield of the reaction product as a fine powder. A phosphorus pentoxide to titanium dioxide mole ratio of about 1.20 to about 1.25 results in over a 90% yield of a dispersable, fine titanium pyrophosphate powder having a particle size less than one micron in diameter.

7 Claims, No Drawings

METHOD FOR PRODUCING A DISPERSIBLE, FINE TITANIUM PYROPHOSPHATE POWDER

This is a divisional application of U.S. patent application Ser. No. 08/597,079 filed Feb. 5, 1996 now U.S. Pat. No. 5,733,519 issued Mar. 31, 1998.

BACKGROUND OF THE INVENTION

This invention relates to a method for producing titanium pyrophosphate. More particularly, this invention relates to a method for thermally reacting titanium dioxide and with an excess of phosphoric acid to form a dispersible, fine titanium pyrophosphate powder.

SUMMARY OF RELATED ART

Titanium pyrophosphate is a white crystalline material suitable for use as a UV-reflective pigment in paints to provide a protective covering against radiation. The titanium pyrophosphate reflects ultraviolet radiation and thereby reduces the absorption of higher energy solar radiation by the structure or object protected with the material. Thus, the heating and degradation of the structure or object are minimized by the reflection of the ultraviolet radiation.

The ability of a pigment to reflect or scatter light is dependent on the particle size, the refractive index, and the absence of light absorption. The average particle size of most pigments is about 0.01–1 micron in diameter. The most effective pigment particle size for light reflection or scattering is approximately half the wavelength of the light. The average particle size of most white pigments, such as titanium dioxide, is in the range of 0.2–0.3 microns. Titanium dioxide pigments reflect visible light at 400–700 nm. For near ultraviolet light, 300–400 nm wavelength, pigment particle diameters near 0.1 to 0.2 micron would be expected to be the most effective for reflection. Satisfactory reflectivity for titanium pyrophosphate is achieved if the particles are in the size range 0.1 to 2.0 microns in diameter.

Reflectivity also depends on the difference between the refractive indices of the pigment and the medium in which they are dispersed. The greater the difference, the higher the reflectivity. Additionally, the absence of light absorption impacts the ability of a pigment to reflect light. Although titanium dioxide is a highly reflective pigment in the visible region of the spectrum, it absorbs and does not reflect light in the near ultraviolet region. In contrast, titanium pyrophosphate does not possess an absorption band in the near ultraviolet region and retains its ability to reflect light.

Titanium pyrophosphate is generally produced by reacting a titanium compound with a phosphorus compound followed by heating to temperatures in excess of 350° C. One conventional method of producing a titanium pyrophosphate involves the formation of a titanium orthophosphate intermediate by reacting a titanium tetrahalide, such as titanium tetrachloride, with phosphoric acid. The reactants are simultaneously introduced in a volume of water to precipitate the intermediate orthophosphate. The orthophosphate compound is recovered from solution and washed prior to forming the pyrophosphate. The orthophosphate material is calcined at temperatures of 750° C. to 1000° C. to form titanium pyrophosphate.

Titanium pyrophosphate is also conventionally produced by the simultaneous oxidation of titanium tetrachloride and phosphorus oxychloride at temperatures of about 1000° C. to 1100° C. The reaction results in the formation of titanium pyrophosphate and chlorine as a by-product.

U.S. Pat. No. 3,996,332 discloses another process for producing titanium pyrophosphate wherein titanium dioxide is mixed in a reaction vessel with phosphoric acid at a phosphorus pentoxide to titanium dioxide mole ratio ($P_2O_5$:$TiO_2$) of one to one. The reaction takes place in the reaction vessel at temperatures of 300–500° C. for one to twelve hours. The resulting product is utilized as a flux in the synthesis of rutile from titaniferous slag. The titanium pyrophosphate processes using reaction components of titanium dioxide and phosphoric acid utilize the one to one phosphorus pentoxide to titanium dioxide mole ratio. In general, the resulting product from this particular process has a greater particle size than the desired fine powder. Furthermore, the granular material resists disintegration, thereby making it difficult to mill the material to the desired particle size for use as an ultraviolet reflecting agent.

Thus, existing titanium pyrophosphate processes involve either the formation of an intermediate, the reaction or calcination of compounds at high temperatures, the formation of undesirable by-products, or the formation of titanium pyrophosphate particles having a greater particle size than the desired fine powder.

It would be advantageous to produce fine titanium pyrophosphate powder with a significantly high fine powder yield. Fine titanium pyrophosphate powder is advantageously employed for use as a pigment or an opacifying agent over coarse material because of the improved texture and reflective properties it imparts to the objects on which it is applied.

Furthermore, it would be advantageous to produce a dispersible, fine titanium pyrophosphate powder directly from a reaction mixture of titanium dioxide and phosphoric acid. The reaction of titanium dioxide and phosphoric acid would eliminate the production of an intermediate orthophosphate or the production of undesirable by-products. An intermediate orthophosphate requires additional processing steps, including high temperature calcination. Furthermore, undesirable by-products often result in additional processing or disposal costs. The production of small particle size or fine titanium pyrophosphate directly from a reaction mixture would eliminate additional processing steps and thereby reduce overall production costs.

SUMMARY OF THE INVENTION

In accordance with the present invention, there is provided a method for producing dispersible, fine titanium pyrophosphate powder by thermally reacting titanium dioxide with phosphoric acid in a reaction mixture having an excess of phosphoric acid. The excess phosphoric acid in the reaction mixture results in a fine titanium pyrophosphate powder at a significantly improved, and desirable, fines yield.

The method of the present invention generally involves the mixture of titanium dioxide and hot concentrated phosphoric acid in a reaction vessel. The reaction mixture has a phosphorus pentoxide to titanium dioxide mole ratio greater than one. Preferably, the phosphorus pentoxide to titanium dioxide mole ratio is about 1.06 or more, and most preferably about 1.20 to about 1.25. The reactants are thoroughly mixed and heated at temperatures of about 400° C. to about 500° C. to produce a fine titanium pyrophosphate powder having a significantly higher fines yield over conventional titanium pyrophosphate processes. The fines yield is greater than 90% when using a phosphorus pentoxide to titanium dioxide mole ratio of about 1.20 to about 1.25.

It is an object of the present invention to provide a method of producing a titanium pyrophosphate from titanium dioxide and phosphoric acid wherein the process results in a finished product exhibiting a significantly higher fines yield than the existing processes known in the art. The method of the present invention is carried out with an excess of phosphoric acid to increase the amount of fines in the resulting titanium pyrophosphate product. Fine titanium pyrophosphate powder is a desirable particle size for use as pigments and opacifying agents in paints and organic polymers.

It is also an object of the present invention to produce a fine titanium pyrophosphate powder directly from titanium dioxide and phosphoric acid. A method of producing a fine titanium pyrophosphate powder directly from the titanium dioxide and phosphoric reaction components eliminates the high temperature calcination of orthophosphate intermediates and the production of undesirable by-products.

DESCRIPTION OF THE PREFERRED EMBODIMENT

In accordance with the present invention, it has surprisingly been discovered that a significant improvement in the fines yield of titanium pyrophosphate may be obtained from the reaction components of titanium dioxide and phosphoric acid, wherein an excess of phosphoric acid is utilized in the reaction mixture. The resulting fine titanium pyrophosphate powder is desirable for direct use as a UV-reflective pigment.

The method of the present invention involves the direct reaction of titanium dioxide with phosphoric acid. The reaction is generally carried out in a reaction vessel at a temperature range of about 400° C. to about 500° C. The reaction proceeds rapidly and may take place in either a batch or continuous process. The reaction vessel dictates the amount of time required to fully react the titanium dioxide and phosphoric acid. The thorough and rapid mixing of the reaction components will lower the reaction time to several minutes while less thorough mixing may require several hours to fully react the components in the mixture.

The reaction temperature of 400° C. to 500° C. may be maintained through either the initial temperature of the phosphoric acid or through a heat transfer means on the reaction vessel. Highly concentrated phosphoric acid must be maintained at relatively high temperatures in order to permit fluid flow. Therefore, heat input from the reaction vessel may not be required with high acid concentrations. However, if needed, sufficient heat to form the titanium pyrophosphate may be supplied by inductive heating, such as a hollow screw or in a furnace. Other heat transfer mechanisms are also suitable for maintaining the appropriate reaction temperatures.

The titanium dioxide utilized in practicing the present inventive method may include various commercially available forms. Either anhydrous or hydrated forms of titanium dioxide are suitable for use in the present invention. Anhydrous titanium dioxide is available in either the rutile or anatase forms. The titanium dioxide particle size utilized in the present invention is generally less than one micron in diameter. Typically, the average particle size is about 0.2 to about 0.3 microns in diameter.

The phosphoric acid is a concentrated phosphoric acid having at least a 75% $H_3PO_4$ concentration. However, a highly concentrated phosphoric acid having an $H_3PO_4$ concentration of at least about 115% is preferred because the highly concentrated forms of phosphoric acid are less corrosive than the lower acid concentrations and less water is evaporated during the process. The reaction temperatures of the inventive process, about 400° C. to 500° C., will concentrate the acid in the reaction mixture. The highly concentrated forms of the phosphoric acid are generally available from heat recovery units on phosphoric acid production processes.

The initial step in the method of the present invention is the thorough mixing and heating of titanium dioxide with phosphoric acid. The mixing and heating may either be simultaneous or sequential. A batch or continuous reaction vessel may be utilized in practicing the present inventive method. The process equipment should provide a means for thoroughly mixing phosphoric acid throughout the titanium dioxide. Incomplete mixing of the reaction components will result in the formation of an amorphous titanium rich phase. The amorphous phase will cause further agglomeration of the finished product.

An excess of phosphoric acid is utilized to obtain the desired fine titanium pyrophosphate power. A phosphorus pentoxide to titanium dioxide mole ratio greater than one is utilized to obtain the fine powder. The fine powder is defined as particles having a particle size less than one micron in diameter. The fines yield in the prior art processes is typically below 60%. The method of the present invention results in a fines yield greater than 60%. Preferably, with a phosphorus pentoxide to titanium dioxide mole ratio of about 1.20 to 1.25, the fines yield is greater than 90%.

In accordance with the practice of the present invention, the excess phosphoric acid used in the reaction mixture results in phosphoric acid remaining on the surface of the titanium pyrophosphate product. There are several ways to remove the excess phosphoric acid from the powder surface to eliminate agglomeration. The phosphoric acid may be removed by vaporization wherein the fine powder is heated at temperatures in excess of 700° C. to remove the excess phosphoric acid.

The excess phosphoric acid may also be removed by extraction from the insoluble titanium pyrophosphate with a liquid, such as water. A water wash will remove the excess phosphoric acid and permit the recovery of the titanium pyrophosphate. The phosphoric acid may then be recovered from the weak acidic solution.

In a preferred method the titanium pyrophosphate is conveyed to an aqueous extractor/separator to remove the excess phosphoric acid. The extractor/separator places the reaction product in water with the appropriate mixing and agitation to remove the excess phosphoric acid. The coarse particles of titanium pyrophosphate settle from the acid solution and then are separated from the resulting slurry by conventional means such as decantation. Fine particles of titanium pyrophosphate are recovered by filtration or centrifugation steps performed in conventional processes known within the art. The resulting titanium pyrophosphate product is then dried to remove excess moisture.

The acidic nature of the reaction mixture used in the present inventive process requires the use of corrosion resistant materials. The preferred material of construction for the reaction vessel and the additional processing equipment is 316L stainless steel. However, other corrosion resistant materials are suitable for practicing the method of the present invention.

The method of the present invention results in the formation of titanium pyrophosphate predominately as a powder. The material has a particle size less than one micron in diameter. Preferably the fine, dispersible powder has a particle size ranging from about 0.03 to 0.30 microns. The surface area of the resulting fine powder is generally near 20 m²\g. The surface area of the titanium pyrophosphate is slightly higher than the surface area for most pigments.

At the preferred phosphorus pentoxide to titanium dioxide mole ratio of about 1.20 to about 1.25, the composition of the resulting product is, by weight, about 20.27% titanium and about 28.69% phosphorus. The resulting fine titanium pyrophosphate powder has a refractive index of about 1.88 and exhibits reflectance in the near UV region of 300 to 400 nanometers. In contrast, titanium dioxide pigments do not exhibit any reflectivity in the near UV region.

The dispersible titanium pyrophosphate powder resulting from the method of the present invention is suitable for use as a UV-reflective pigment. A fine titanium pyrophosphate powder reflects ultraviolet radiation and thereby reduces the absorption of solar radiation by the structure or object protected with the material. The titanium pyrophosphate also provides heat stability and resistance to chemical attack, and is therefore well suited for various other applications.

In one such application, the titanium pyrophosphate of this invention provides a protective coating by means of dispersing the fine powder in a plastic material which can be employed as a coating on various substrates to be protected from UV light. Alternatively, the bulk of a polymer may be mixed with the fine particle titanium pyrophosphate of the invention rather than relying on a layer with a loading of fine particles of titanium pyrophosphate. Any suitable plastic material containing the fine particle can be employed. Typical polymers include, without limitation, polyethylene, polypropylene, polystyrene, polyacrylate, polymethyl methacrylate, polyvinyl chloride, polyvinyl alcohol, polycarbonate, polyacetals, polyesters, polyamides, and polyimides. Also, the fine particle titanium pyrophosphate of this invention can be dispersed into mixtures of polymers such as, without limitation, polypropylene with polyisobutylene, polypropylene with polyethylene and mixtures of different types of the same polymer such as high density and low density polyethylene. In addition, any suitable copolymer can be employed as the base or substrate into which the fine particle titanium pyrophosphate of this invention can be dispersed. Typical, non-limiting examples of copolymers are copolymers of monoolefins and diolefins with each other or with other vinyl monomers, form example ethylene/propylene copolymers, linear low density polyethylene and mixtures thereof with low density polyethylene, polypropylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene vinyl acetate copolymers and their copolymers with carbon monoxide or ethylene/acrylic acid copolymers and their salts (ionomers) as well terpolymers of ethylene with proplyene and a diene such as hexadiene, dicyclopentadiene or ethylidene-norbornene; and mixtures of such copolymers with one another and with polymers mentioned above.

A wide range of loadings of the fine particle titanium pyrophosphate of this invention effects UV reflectance and thus protection of the substrate involvoyed. Typical loadings, by weight, range from 5% to about 60% and most usually from about 20% to about 50%. Such loadings result in reflectance of UV light in the range of from about 15% to about 35%, depending upon the thickness of the polymer layer containing the dispersed fine particles of titanium pyrophosphate of this invention. The titanium pyrophosphate of this invention may be employed together with typical pigments and other colorants to provide a combination of absorption and reflectance of light. Most typically titanium dioxide may be combined in the polymer with titanium pyrophosphate.

The following examples, which constitute the best mode presently contemplated by the inventor for practicing the invention, are presented solely for the purpose of further illustrating and disclosing the present invention, and are not to be construed as a limitation on the invention. All percentages given in the examples are by weight unless otherwise noted.

EXAMPLES

Three samples were prepared in order to demonstrate the improved fine titanium pyrophosphate powder yields resulting from the method of the present invention. Each sample included a reaction mixture of anhydrous titanium dioxide in the anatase form added to concentrated phosphoric acid in a sigma blade mixer having a one liter capacity. The phosphorus pentoxide to titanium dioxide mole ratio was varied for each of the three samples. In the first sample, 672 grams of 115% phosphoric acid were added to 315 grams of titanium dioxide to provide a sample having a phosphorus pentoxide to titanium dioxide mole ratio of about 1.00. A second sample was prepared having 712 grams of 115% phosphoric acid and 315 grams of titanium dioxide to obtain a phosphorus pentoxide to titanium dioxide mole ratio of about 1.06. The third sample contained about 820 grams of 115% phosphoric acid and 315 grams of titanium dioxide to provide a sample having a phosphorus pentoxide to titanium dioxide mole ratio of about 1.22.

The resulting slurries were heated in a vacuum oven at 120° C. to dislodge entrapped air which potentially reduces the contact between the reactants. The samples were then placed in ceramic crucibles and heated in a furnace to 450° C. for 60 minutes to form titanium pyrophosphate. The resulting product was then washed in a water solution under vigorous agitation to remove excess phosphoric acid. The slurry was then allowed to settle in order to classify the material and reject coarse particles. The coarse particles settled to the bottom of the container while the majority of the fine particles remained suspended. The top 80–90%, by volume, of the slurry containing the fine particles was decanted and collected. The collected slurry having the suspended fine particles was then stirred, settled, and decanted a second time to further ensure the rejection of coarse particles. The decanted portion containing the suspended titanium pyrophosphate was centrifuged in order to separate the fine particles from the solution. The fine particles were then dried for 3 hours at 150° C. to remove excess moisture from the particle surface.

In all three samples, the resulting product was a dispersible, fine powder having a refractive index of about 1.88. The particle size of the fine powder was less than 1 micron in diameter. The reflectance and transmittance properties were measured in a pigmented film of polyvinyl alcohol ("PVA") which was supported on a glass microscope slide. The pigments were mixed with a 7 weight percent solution of PVA in water. Weight ratios of pigment to dry PVA were either 0.5 or 1.0. The pigments were mixed in the solution first by a mortar and pestle and then in a high speed virtishear mixer. The resulting slurries were spread on clean microscope slides using a coating rod to insure as much consistency in film thickness as possible. The coated slides were allowed to dry 60° C. The water lost during drying resulted in coatings having a 33 or 50 weight percent pigment content. The thickness of the coatings was determined using a Sloan DEKTAK 3030 instrument. The coatings measured four to two microns in thickness for 33% or 50% pigment loadings, respectively. A 33% pigment loading exhibited a reflectance of about 25% at 350 nm whereas the 50% pigment loading exhibited a reflectance of about 30% at 350 nm. The total light transmission for the 33% and 50% pigment loadings were about 74.4% and 70.8%, respectively. The reflectance and transmittance properties were recorded using a Perkin-Elmer Lambda 9 Spectrophotometer. The reflectance spectra was obtained using an integrating sphere compartment as measured against a Lab Sphere SRS-99 white reflectance standard.

The fines yields for the three samples were calculated by stirring 0.10–0.15 grams of the resulting product, prior to separation of the coarse material, in 25 ml of water at ambient temperature for one hour at 680 rpm with a stir bar in a 50 ml beaker. The slurry was allowed to sit for about three minutes before the top 20 ml was withdrawn. The remaining 5 ml was filtered through a #1 Whatman filter paper under vacuum. The finer material passed through the filter. The coarse residue from the filter paper was then dried at 150° C. for one hour and weighed. The results for all three samples are listed in Table I.

The $P_2O_5$ yield for the three samples was determined by extraction of about 0.25 grams in 25 ml of water for one hour at ambient temperature. The cloudy sample was centrifuged and 10.0 ml of the supernatant was added to 15 ml of water and 5 ml of concentrated hydrochloric acid. The sample was boiled for one hour to convert all $P_2O_5$ to the orthophosphate form. The sample was titrated with 0.1N sodium hydroxide to determine the amount of unreacted phosphoric acid. The $P_2O_5$ yield is based on a stoichiometric reaction between titanium dioxide and phosphorus pentoxide with titanium dioxide as the limiting reagent.

TABLE I

| Sample No. | Mole Ratio $P_2O5$: $TiO_2$ | $H_3PO_4$ Conc. (%) | Calcination Temp. (° C.) | Calcination Time (Min) | Fines Yield (%) | $P_2O_5$ Yield (%) |
| --- | --- | --- | --- | --- | --- | --- |
| 1 | 1.00 | 115 | 450 | 60 | 52 | — |
| 2 | 1.06 | 115 | 450 | 60 | 74 | 95 |
| 3 | 1.22 | 115 | 450 | 60 | 93 | 101 |

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. An article of manufacture having UV reflectance comprising a polymer having dispersed therein a UV reflecting amount of fine titanium pyrophosphate powder prepared by thermally reacting titanium dioxide with phosphoric acid in a reaction mixture having a phosphorus pentoxide to titanium dioxide mole ratio greater than one and removing excess phosphoric acid from said fine titanium pyrophosphate powder.

2. An article of claim 1 wherein the polymer is selected from the group consisting of polyethylene, polypropylene, polystyrene, polyacrylate, polymethyl methacrylate, polyvinyl chloride, polyvinyl alcohol, polycarbonate, polyacetals, polyesters, polyamides, and polyimides and mixtures thereof.

3. An article of claim 2 wherein the polymer is polyvinyl alcohol.

4. An article of claim 1 wherein the polymer contains from about 20% to about 60%, by weight, titanium pyrophosphate.

5. An article of claim 1 wherein the polymer is a copolymer selected from the group consisting of ethylene/propylene copolymers, linear low density polyethylene and mixtures thereof with low density polyethylene, polypropylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene vinyl acetate copolymers and their copolymers with carbon monoxide or ethylene/acrylic acid copolymers and their salts (ionomers).

6. An article of claim 1 wherein the polymer is a terpolymer.

7. An article of claim 6 wherein the terpolymer is selected from the group consisting of terpolymer from ethylene with propylene, hexadiene, dicyclopentadiene or ethylidenenorbomene; and mixtures of such copolymers with one another and with polymers selected from the group consisting of ethylene/propylene copolymers, linear low density polyethylene and mixtures thereof with low density polyethylene, polypropylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene vinyl acetate copolymers and their copolymers with carbon monoxide or ethylene/acrylic acid copolymers and their salts (ionomers).

* * * * *

UNITED STATES PATENT AND TRADEMARK OFFICE
CERTIFICATE OF CORRECTION

PATENT NO. : 6,114,427
DATED : September 5, 2000
INVENTOR(S) : David R. Gard

It is certified that error appears in the above-identified patent and that said Letters Patent are hereby corrected as shown below:

Column 8, line 37-38, please replace the word "ethylidenenorbomene" with "ethylidenenorbornene".

Signed and Sealed this

Fifteenth Day of May, 2001

*Attest:*

NICHOLAS P. GODICI

*Attesting Officer*     *Acting Director of the United States Patent and Trademark Office*